United States Patent
Lee

(10) Patent No.: US 7,623,196 B2
(45) Date of Patent: Nov. 24, 2009

(54) LCD MODULE WITH MOUNTING CLIP CLIPPED ON SIDE OF TOP CASE HAVING PARTS ON INNER AND OUTER SIDE SURFACES OF TOP CASE AND HOLE MATING WITH MAIN SUPPORT HOLE FOR COUPLING SCREW

(75) Inventor: Chan-Heon Lee, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 425 days.

(21) Appl. No.: 11/635,585

(22) Filed: Dec. 8, 2006

(65) Prior Publication Data

US 2007/0132913 A1      Jun. 14, 2007

(30) Foreign Application Priority Data

Dec. 8, 2005    (KR) .................... 10-2005-0119263

(51) Int. Cl.
*G02F 1/1333*      (2006.01)

(52) U.S. Cl. ........................................ 349/58
(58) Field of Classification Search .............. 349/58–60
See application file for complete search history.

(56) References Cited

U.S. PATENT DOCUMENTS

| 7,369,190 B2 * | 5/2008 | Park .............................. 349/58 |
| 2001/0050732 A1 * | 12/2001 | Okamoto et al. .............. 349/58 |
| 2004/0189889 A1 * | 9/2004 | Nitto et al. .................... 349/58 |

* cited by examiner

*Primary Examiner*—John Heyman
(74) *Attorney, Agent, or Firm*—McKenna Long & Aldridge

(57) ABSTRACT

A liquid crystal display module is provided which includes a main support that supports a backlight unit and a liquid crystal panel wherein a side of the main support has a recess; a top case at a top of the liquid crystal display module wherein a side of the top case has a first hole; a mounting clip clipped on a side of the top case and having a second hole corresponding to the first hole; a bottom case at a bottom of the liquid crystal display module; and a screw passing through the second hole and the recess to couple the support main and the top case.

18 Claims, 5 Drawing Sheets

LCD MODULE WITH MOUNTING CLIP CLIPPED ON SIDE OF TOP CASE HAVING PARTS ON INNER AND OUTER SIDE SURFACES OF TOP CASE AND HOLE MATING WITH MAIN SUPPORT HOLE FOR COUPLING SCREW

This application claims the benefit of Korean Patent Application No. 2005-0119263, filed on Dec. 8, 2005, which is hereby incorporated by reference for all purposes as if fully set forth herein.

BACKGROUND OF THE INVENTION

1. Field of the Invention

The present application relates to a liquid crystal display module.

2. Discussion of the Related Invention

Display devices have typically used cathode-ray tubes (CRT). Presently, much effort has been expended to study and develop various types of flat panel displays, such as liquid crystal display (LCD) devices, plasma display panels (PDP), field emission displays, and electro-luminescence displays (ELD), as a substitute for CRTs. LCD devices have advantages over the other flat panel displays. Some of the advantages are high resolution, light weight, thin profile, compact size, and low power supply requirements.

In general, an LCD device includes two substrates that are spaced apart and face each other with a liquid crystal material interposed between the two substrates. The two substrates include electrodes that face each other. A voltage applied between the electrodes induces an electric field across the liquid crystal material. Alignment of the liquid crystal molecules in the liquid crystal material changes in accordance with the intensity of the induced electric field, thereby changing the light transmissivity of the LCD device. Thus, the LCD. device displays images by varying the intensity of the induced electric field.

FIG. 1 is a plan view illustrating an LCD module according to the related art, FIG. 2 is a cross-sectional view taken along a line II-II of FIG. 1, and FIG. 3 is a perspective view illustrating a mounting assistant of FIG. 2.

Referring to FIGS. 1 to 3, the LCD module includes a liquid crystal panel 30, a backlight assembly, a main support 10, a top case 50 and a bottom case 40.

The main support 10 has a rectangular frame shape. The main support 10 supports the backlight assembly and the liquid crystal panel 30 sequentially placed therein.

The backlight assembly includes at least one lamp (not shown), a reflecting sheet 22, a light guide plate 26, and a plurality of optical sheets 28 such as a prism sheet and a diffusion sheet.

The top case 50 is located on the top of the liquid crystal panel 30. The top case 50 presses and fixes a peripheral portion of the liquid crystal panel 30. The bottom case 40 is coupled to the top case 50.

Although not shown in the drawings, a driving circuit (not shown) is connected to the liquid crystal panel 30 through a flexible printed circuit board (FPCB).

In the related art LCD module, the main support 10 and the top case 50 are coupled with a screw 55 at sides of the LCD module. The bottom case 40 may also be coupled with them. This coupling system is referred to as a side mounting system. The LCD module adopting the side mounting system has an advantage of a thin profile.

In the related art LCD module with the side mounting system, the screw 55 passes through the sides of the top case 50 and the main support 10. To fix them firmly together, a mounting assistant 53 is used. The mounting assistant 53 is mounted on the side of the main support 10 and receives the screw 55.

Referring to FIG. 3, the mounting assistant 53 has a base part and wing parts 57. The base part has a hole H through which the screw 55 passes. The wing parts 57 are bent at both sides of the base part. The wing parts 57 are inserted into the main support 10 to fix the mounting assistant 53 to the main support 10.

There occur some problems due to using the mounting assistant 53 in the related art LCD device. To fix the mounting assistant 53 to the main support 10 firmly, the wing part 57 should have a predetermined length. When the wing part 57 does not have the predetermined length, the mounting assistant 53 is to be detached, and thus reliability of the LCD module is reduced. Accordingly, the side of the main support 10 at least has a thickness corresponding to the predetermined length of the wing part 57. This causes the LCD module not have the thin profile.

Further, the main support 10 should have portions receiving the wing parts 57. It is difficult to manufacture a mold for the portions and to assemble the mounting assistant 53 and the main support 10.

SUMMARY OF THE INVENTION

Accordingly, the present invention is directed to a liquid crystal display module that substantially obviates one or more of the problems due to limitations and disadvantages of the related art.

An advantage of the present invention is to provide an improved structure and method for securing and mounting LCD panels.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings To achieve these and other advantages and in accordance with the purpose of the present invention, as embodied and broadly described, a liquid crystal display module includes: a main support that supports a backlight unit and a liquid crystal panel wherein a side of the main support has a recess; a top case at a top of the liquid crystal display module wherein a side of the top case has a first hole; a mounting clip clipped on a side of the top case and having a second hole corresponding to the first hole; a bottom case at a bottom of the liquid crystal display module; and a screw passing through the second hole and the recess to couple the support main and the top case.

In another aspect of the present invention, a display apparatus equipped with a liquid crystal display module includes: a liquid crystal module including: a main support that supports a backlight unit and a liquid crystal panel wherein a side of the main support has a recess; a top case at a top of the liquid crystal display module wherein a side of the top case has a first hole; a mounting clip clipped on a side of the top case and having a second hole corresponding to the first hole; and a bottom case at a bottom of the liquid crystal display module; a hinge having a third hole; and a screw passing through the recess of the main support, the second hole and the third hole to couple the liquid crystal module and the hinge.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, examples of which is illustrated in the accompanying drawings Exemplary embodiments may be better understood with reference to the drawings, but these examples are not intended to be of a limiting nature.

Figure 1:
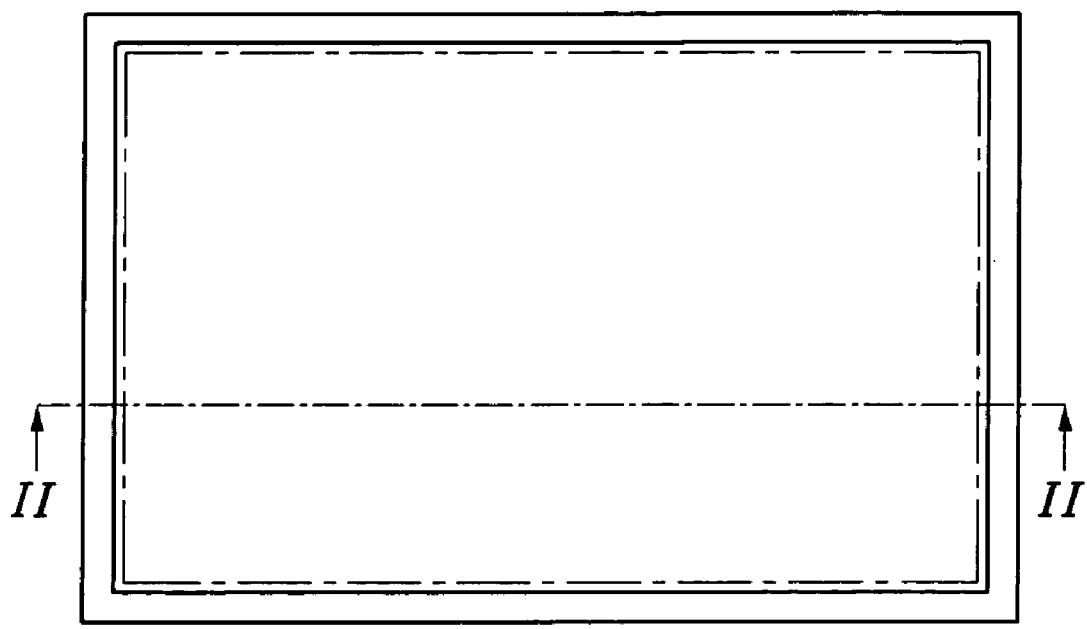
FIG. 1 is a plan view illustrating an LCD module according to the related art.
Figure 2:
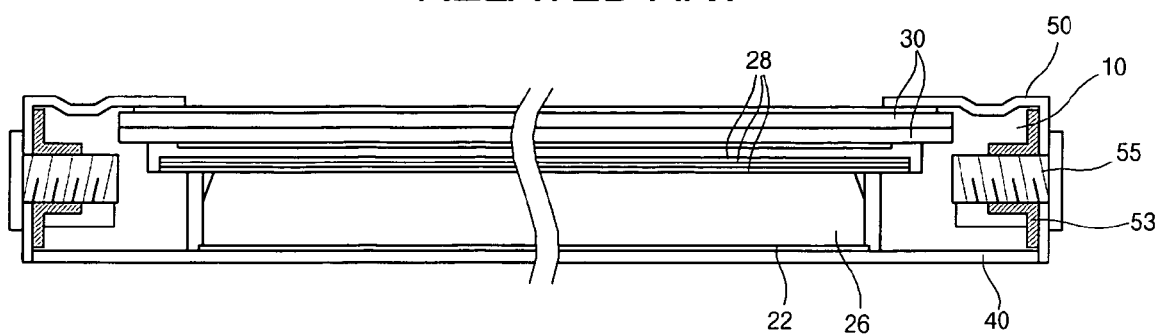
FIG. 2 is a cross-sectional view of an LCD module taken along a line II-II of FIG. 1.
Figure 3:
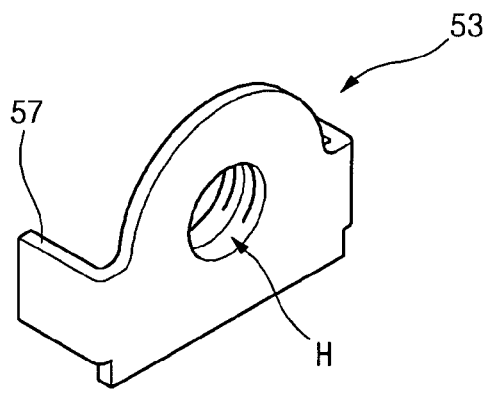
FIG. 3 is a perspective view illustrating a mounting assistant of FIG. 2.
Figure 4:
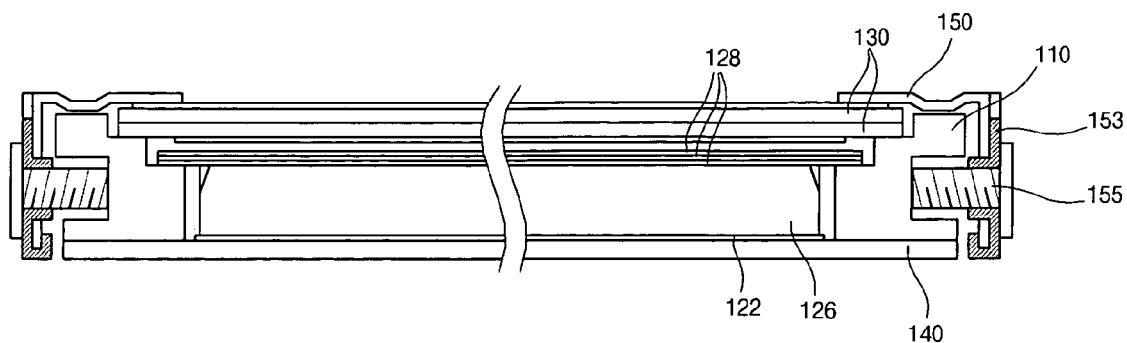
FIG. 4 is a cross-sectional view illustrating an LCD module according to an exemplary embodiment of the present invention.
Figure 5A:
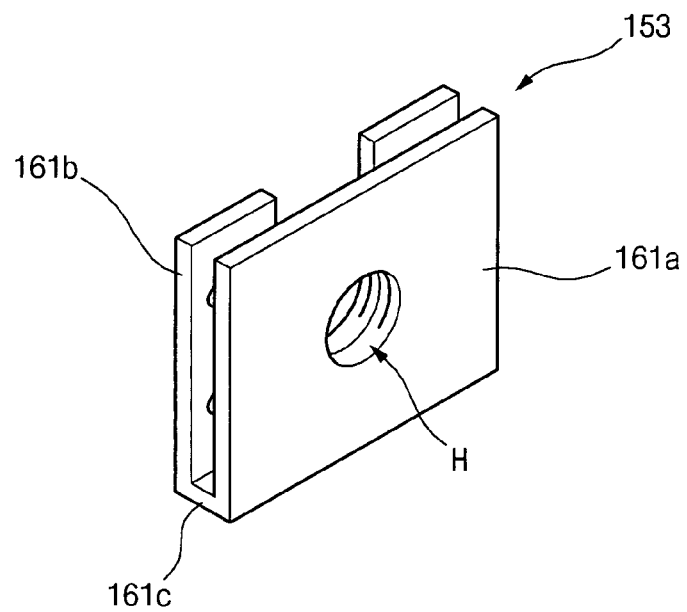
FIGS. 5A and 5B are perspective views illustrating a mounting clip of FIG. 4.
Figure 5B:
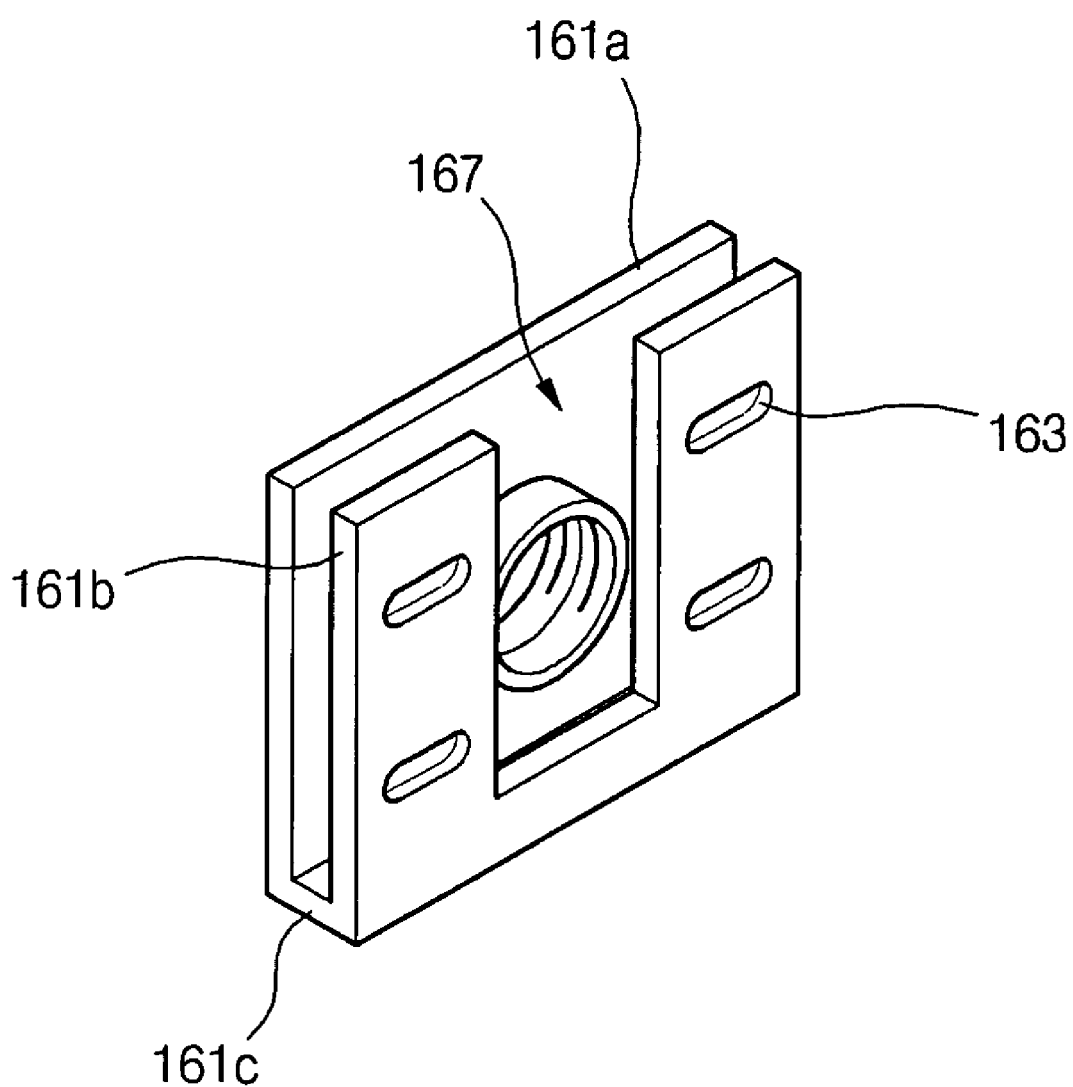
Figure 6:
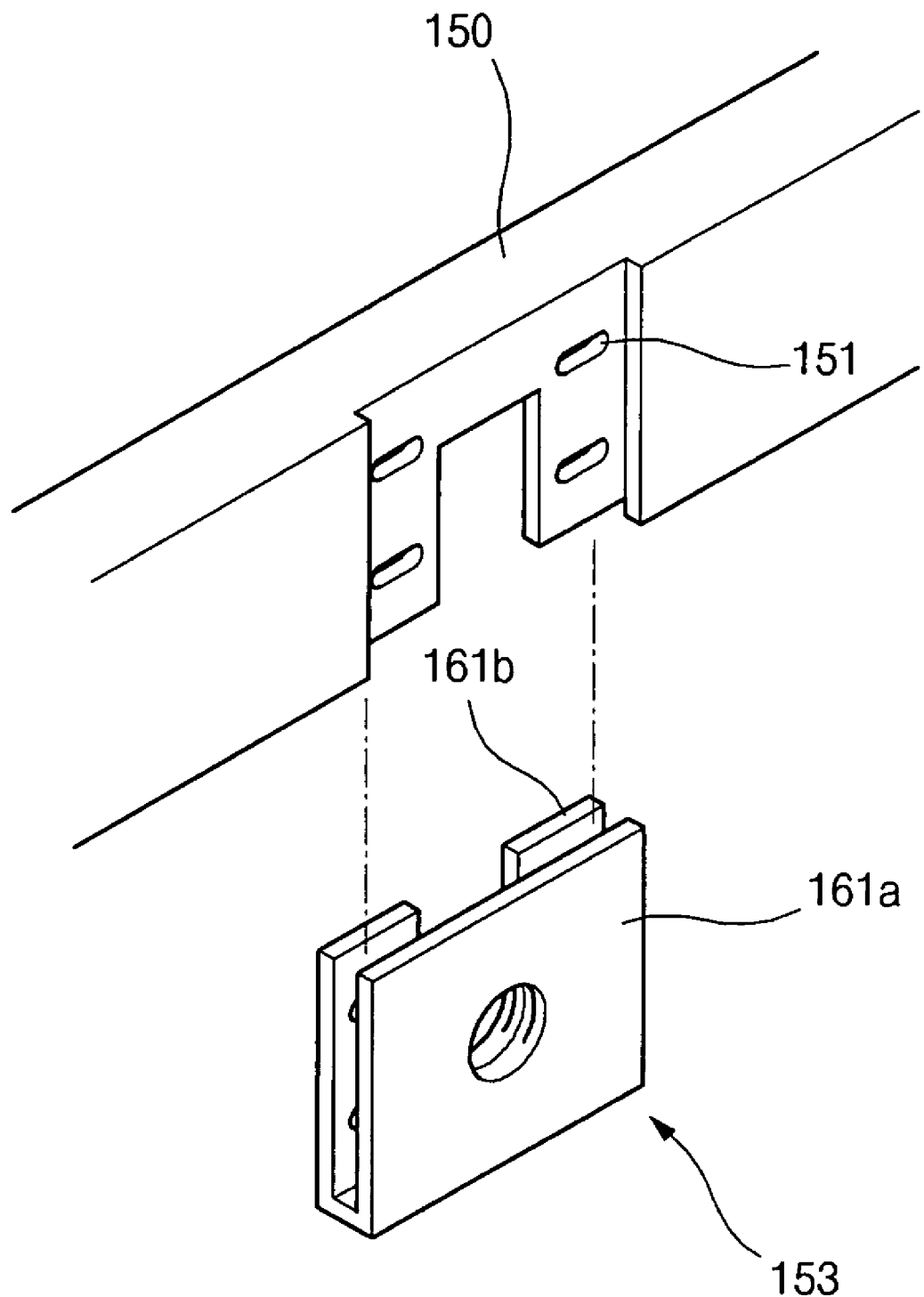
FIG. 6 is an exploded perspective view illustrating a coupling of a mounting clip and a top case of FIG. 4.

FIG. 4 is a cross-sectional view illustrating an LCD module according to an exemplary embodiment of the present invention, FIGS. 5A and 5B are perspective views illustrating a mounting clip of FIG. 4, and FIG. 6 is an exploded perspective view illustrating a coupling of a mounting clip and a top case of FIG. 4.

Referring to FIGS. 4 to 6, the LCD module according to the exemplary embodiment of the present invention includes a liquid crystal panel 130, a backlight assembly, a main support 110, a top case 150 and a bottom case 140.

The main support 110 has a rectangular frame shape. The main support 110 supports the backlight assembly and the liquid crystal panel 130 sequentially placed therein. The main support 110 is coupled with the top case 150.

The backlight assembly includes at least one lamp (not shown), a reflecting sheet 122, a light guide plate 126, and a plurality of optical sheets 128 such as a prism sheet and a diffusion sheet.

The top case 150 is located on the top of the liquid crystal panel 130. The top case 150 presses and fixes a peripheral portion of the liquid crystal panel 130.

The bottom case 140 is located along a rear surface of the main support 110. The bottom case 140 is coupled with the top case 150.

Although not shown in the drawings, a driving circuit (not shown) may be connected to the liquid crystal panel 130 through a flexible printed circuit board (FPCB).

The main support 110 and the top case 150 are combined together at sides of the LCD module using a screw 155. The bottom case 140 may be coupled with the main support 110 and the top case 150 at sides of the LCD device by using the screw 155. When the bottom case 140 is coupled, a side of the bottom case 140 may be outside a side of the top case 150, and alternatively, the side of the bottom case 140 may be between a side of the main support 110 and the side of the top case 150.

The bottom case 140 may be coupled with the main support 110 and the top case 150 at sides different from the sides as shown in FIG. 4. In other words, the main support 110 and the top case 150 are coupled at both sides of FIG. 4, and the bottom case 140, the main support 110 and the top case 150 are coupled at sides different from both sides of FIG. 4.

The bottom case 140 may be coupled with one of the top case 150 and the main support 110, and this coupling may be at sides or bottom of the LCD module.

To couple the main support 110 and the top case 150, a mounting clip 153 is mounted on the side of the top case 150. The top case 150 has a screw hole through which the screw 155 passes. When the bottom case 140 is coupled with the top case 110 and mounting clip 153, the bottom case 140 also has a screw hole through which the screw 155 passes. The main support 110 has also a screw recess receiving the screw 155. In particular, the mounting clip 153 has a hole H corresponding to the screw hole of the top case 150, and the screw 155 passes through the hole of the mounting clip 153. With this mounting system, the components of the LCD device are firmly combined.

The mounting clip 153 includes a first part 161a to receive the screw 155, a second part 161b, to be combined with the top case 150, and a third part 161c connecting the first and second parts 161a and 161b.

The first part 161a has the hole H into which the screw 155 is inserted. An inner surface of the first part 161a may contact an outer surface of the side of the top case 150. The hole H may protrude from the first part 161a toward the second part 161b. A portion of the first part 161a defining the hole H has a female screw thread corresponding to a male screw thread of the screw 155. The screw recess of the main support 110 may also have a female screw thread corresponding to the male screw thread of the screw 155.

The second part 161b is spaced apart from and faces the first part 161a. The inner surface of the second part 161b, may contact an inner surface of the top case 150. The second part 161b has an embossed pattern 163 to couple the mounting clip 153 with the top case 150. The embossed pattern 163 protrudes toward the first part 161a.

Referring to FIG. 6, the top case 150 has a receiver 151 that couples to the embossed pattern 163. The receiver 151 may be a hole or recess receiving the embossed pattern 163. To couple the mounting clip 153 with the top case 150, the mounting clip 153 is pushed toward the top case 150, and first and second parts 161a and 161b spread apart while pushing the mounting clip 153. Then, the embossed pattern 163 is inserted into the receiver 151. Accordingly, the embossed pattern 163 together with the corresponding receiver 151 firmly couples the mounting clip 153 to the top case 150.

The second part 161b has an opening 167 so that the screw 153 passing through the hole H can pass through the second part 161b and reach the screw recess of the main support 110.

The distance between the first and second parts 161a and 161b may be equal to or less than a thickness of the side of the top case 150. The first and second parts 161a and 161b, may have a height equal to or less than a height of the side of the top case 150.

The mounting clip 153 may be made of stainless steel (STS). STS is suitable for a tapping treatment for forming the female screw thread in the mounting clip 153. The top case 150 may be made of aluminum (Al). Aluminum (Al) is light, and thus, the LCD module can have a low weight.

A number of the coupling holes 151 and the embossed patterns 163 may be varied according to a coupling area of the top case 150 and the mounting clip 153.

As explained above, the mounting clip 153 is mounted on the top case 150 to couple the top case 150 and the main support 110. Accordingly, a thickness of the main support 110 does not need to increase, and thus the LCD module can have a thin profile. Also, difficulty in manufacturing a mold for the portions corresponding to the wing parts of the mounting assistant in the related art and assembling the mounting assistant and the main support in the related art can be improved.

Further, because the mounting clip is simply mounted on the top case, assembling of the LCD module may be simple and easy.

Further, the top case may include aluminum that is light, and the tapping treatment is performed for the mounting clip instead of the top case which is unsuitable for the tapping treatment. Accordingly, the LCD module may have a low weight, and also, a reliability coupling.

The exemplary embodiment of the present invention may be applicable to a display apparatus equipped with the LCD module, for example, a notebook. In other words, when a hinge of the notebook corresponding to the side of the LCD module has a screw hole and is coupled with the LCD module, the mounting clip mounted on the top case can receive the screw passing through the hinge.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display module, comprising:
   a main support that supports a backlight unit and a liquid crystal panel wherein a side of the main support has a recess;
   a top case at a top of the liquid crystal display module wherein a side of the top case has a first hole;
   a mounting clip clipped on a side of the top case and having a second hole corresponding to the first hole, wherein the mounting clip includes a first part on an outer surface of the side of the top case, and a second part between an inner surface of the side of the top case and the side of the main support;
   a bottom case at a bottom of the liquid crystal display module; and
   a screw passing through the second hole and the recess to couple the support main and the top case.

2. The module according to claim 1, wherein the mounting clip includes the first part having the second hole and the second part facing the first part and coupled to the side of the top case.

3. The module according to claim 2, wherein the second part and the top case are coupled by an embossed pattern and a receiver receiving the embossed pattern.

4. The module according to claim 3, wherein the second part has the embossed pattern and the top case has the receiver.

5. The module according to claim 2, wherein the first part contacts the outer surface of the side of the top case and the second part contacts the inner surface of the side of the top case.

6. The module according to claim 2, wherein the second part includes an opening through which the screw passes.

7. The module according to claim 2, wherein the mounting clip further includes a third part connecting the first and second parts wherein the third part is at a bottom of the side of the top case.

8. The module according to claim 1, wherein the bottom case includes a third hole through which the screw passes.

9. The module according to claim 1, wherein the mounting clip includes stainless steel (STS) and the top case includes aluminum (Al).

10. A display apparatus equipped with a liquid crystal display module, comprising:
    a liquid crystal module including:
    a main support that supports a backlight unit and a liquid crystal panel wherein a side of the main support has a recess;
    a top case at a top of the liquid crystal display module wherein a side of the top case has a first hole;
    a mounting clip clipped on a side of the top case and having a second hole corresponding to the first hole; and
    a bottom case at a bottom of the liquid crystal display module;
    a hinge having a third hole; and
    a screw passing through the recess of the main support, the second hole and the third hole to couple the liquid crystal module and the hinge.

11. The apparatus according to claim 10, wherein the mounting clip includes a first part having the second hole and a second part facing the first part and coupled to the side of the top case.

12. The apparatus according to claim 11, wherein the second part and the top case are coupled by an embossed pattern and a receiver receiving the embossed pattern.

13. The apparatus according to claim 12, wherein the second part has the embossed pattern and the top case has the receiver.

14. The apparatus according to claim 11, wherein the first part contacts an outer surface of the side of the top case and the second part contacts an inner surface of the side of the top case.

15. The apparatus according to claim 11, wherein the second part includes an opening through which the screw passes.

16. The apparatus according to claim 11, wherein the mounting clip further includes a third part connecting the first and second parts wherein the third part is at a bottom of the side of the top case.

17. The apparatus according to claim 10, wherein the bottom case includes a fourth hole through which the screw passes.

18. The apparatus according to claim 10, wherein the mounting clip includes stainless steel (STS) and the top case includes aluminum (Al).

* * * * *